US012715345B2

(12) United States Patent
Ahopelto et al.

(10) Patent No.: US 12,715,345 B2
(45) Date of Patent: Aug. 25, 2026

(54) SEAT CONTROL ARRANGEMENT OF FOREST MACHINE

(71) Applicant: PONSSE OYJ, Vieremä (FI)

(72) Inventors: Miika Ahopelto, Vieremä (FI); Aleksi Kivi, Vieremä (FI)

(73) Assignee: PONSSE OYJ, Vieremä (FI)

( * ) Notice: Subject to any disclaimer, the term of this patent is extended or adjusted under 35 U.S.C. 154(b) by 203 days.

(21) Appl. No.: 18/833,289

(22) PCT Filed: Jan. 19, 2023

(86) PCT No.: PCT/FI2023/050042
§ 371 (c)(1),
(2) Date: Jul. 25, 2024

(87) PCT Pub. No.: WO2023/144444
PCT Pub. Date: Aug. 3, 2023

(65) Prior Publication Data

US 2025/0100426 A1 Mar. 27, 2025

(30) Foreign Application Priority Data

Jan. 26, 2022 (FI) ..................................... 20225064

(51) Int. Cl.
*A01G 23/00* (2006.01)
*B60N 2/02* (2006.01)
(Continued)

(52) U.S. Cl.
CPC ............. *B60N 2/14* (2013.01); *A01G 23/006* (2013.01); *B60N 2/02246* (2023.08); *B60N 2/38* (2013.01); *E02F 9/166* (2013.01); *E02F 9/265* (2013.01)

(58) Field of Classification Search
CPC ........ B60N 2/14; B60N 2/02246; B60N 2/38; B60N 2/24; A01G 23/006; A01G 23/00; A01G 23/003; E02F 9/166; E02F 9/265
(Continued)

(56) References Cited

U.S. PATENT DOCUMENTS 7,950,492 B2 * 5/2011 Jorgensen ............. B60S 1/0896 297/344.21
9,510,522 B2 * 12/2016 Yrjänä .................... B66C 23/42
(Continued)

FOREIGN PATENT DOCUMENTS

CN 103732524 4/2014
CN 106314213 1/2017
(Continued)

OTHER PUBLICATIONS

Sep. 30, 2025 Office Action issued in Chinese Patent Application No. 202380018708.7, pp. 1-11 [English translation included].
(Continued)

*Primary Examiner* — Maria E Graber
(74) *Attorney, Agent, or Firm* — Nixon & Vanderhye PC

(57) ABSTRACT

A seat (104) control arrangement of a forest machine comprising a rotating seat (104) having a seat (104) actuator configured to rotate (360) the seat (104), means for determining at least a position of the seat (104) and a position of a tip (112) of a boom (110, 112) of the forest machine and a processing circuitry (114) configured to provide, based on the determination of the means, a control signal to the seat (104) actuator to rotate (360) the seat (104) such that the position of the seat (104) follows the position of the tip (112) of the boom (110, 112) with a predetermined deviation when the position of the tip (112) of the boom (110, 112) deviates from a base centre line of the forest machine, and wherein the predetermined deviation is towards the base centre line
(Continued)

Figure 1:
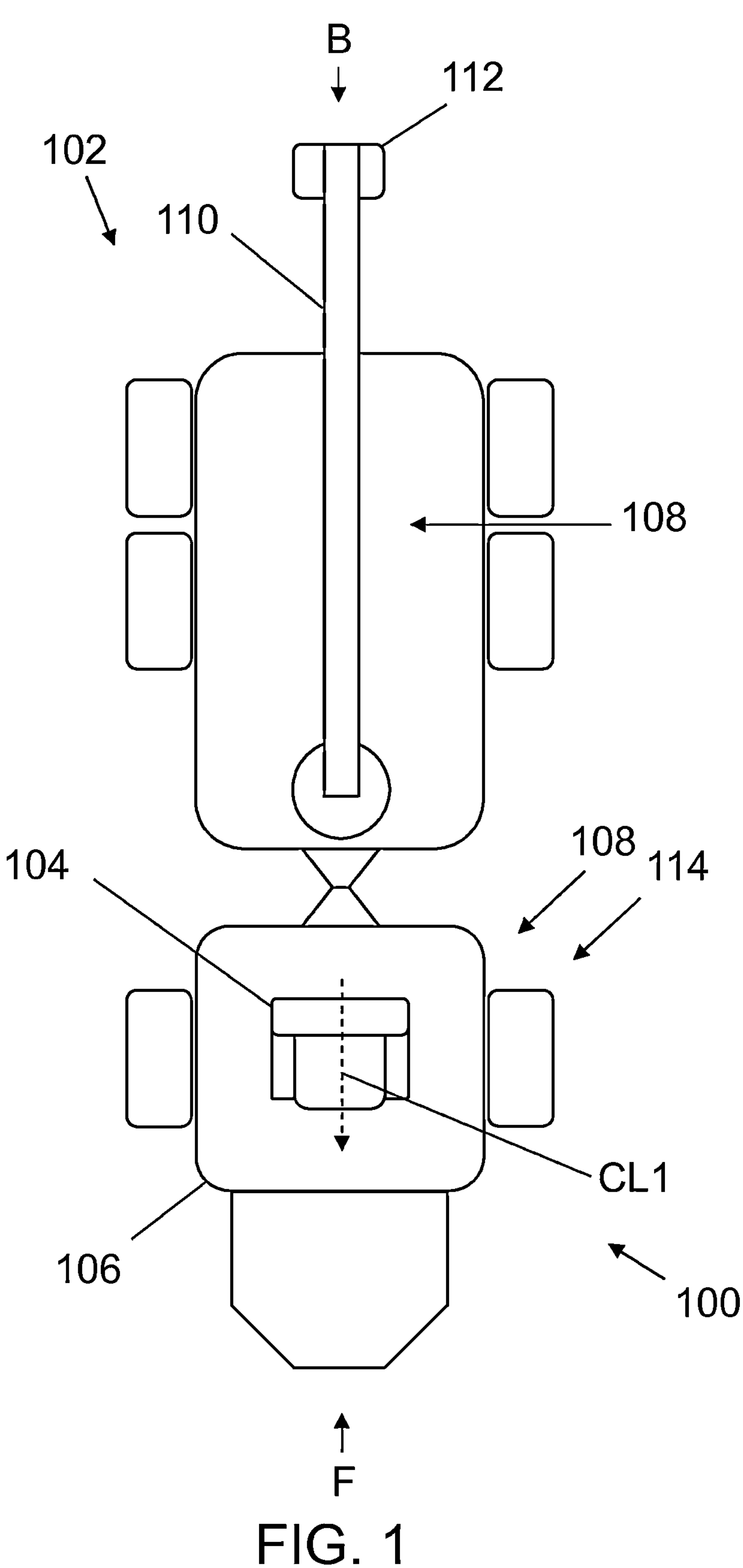

of the forest machine from the position of the tip (112) of the boom.

21 Claims, 12 Drawing Sheets

(51) Int. Cl.
*B60N 2/14* (2006.01)
*B60N 2/38* (2006.01)
*E02F 9/16* (2006.01)
*E02F 9/26* (2006.01)

(58) Field of Classification Search
USPC .................................................... 297/344.21
See application file for complete search history.

(56) References Cited

U.S. PATENT DOCUMENTS

| | | | |
|---|---|---|---|
| 12,259,089 B2 * | 3/2025 | Savolainen ............. | F16P 3/144 |
| 12,577,760 B2 * | 3/2026 | Kyozu .................... | E02F 9/265 |
| 2002/0053442 A1 | 5/2002 | Halme et al. | |
| 2014/0193231 A1 | 7/2014 | Yrjana et al. | |
| 2022/0195704 A1 * | 6/2022 | Shimizu ................ | E02F 9/2079 |
| 2022/0195705 A1 * | 6/2022 | Krause .................. | E02F 9/2041 |
| 2024/0123874 A1 * | 4/2024 | Kondrad ............ | B60N 2/02246 |
| 2026/0021702 A1 * | 1/2026 | Weigand .............. | B60K 35/658 |

FOREIGN PATENT DOCUMENTS

| | | |
|---|---|---|
| CN | 207403823 | 5/2018 |
| EP | 1201832 A1 | 5/2002 |
| EP | 3741916 | 11/2020 |
| FI | 110502 B | 2/2003 |
| FI | 20002338 | 10/2024 |
| FR | 128122 | 10/2019 |
| RU | 2139801 | 10/1999 |
| RU | 2556802 | 12/2014 |
| RU | 204697 | 6/2021 |
| TW | 201946602 | 12/2019 |

OTHER PUBLICATIONS

Search Report for FI Application No. 20225064 dated Jun. 9, 2022, 1 page.
International Search Report and Written Opinion of the ISA for PCT/FI2023/050042 dated Apr. 24, 2023, 12 pages.
Feb. 7, 2025 Office Action issued in Russian Patent Application No. 2024123931, pp. 1-7.
Feb. 3, 2025 Search Report issued in Russian Patent Application No. 2024123931, pp. 1-2.

* cited by examiner

SEAT CONTROL ARRANGEMENT OF FOREST MACHINE

CROSS-REFERENCE TO RELATED APPLICATIONS

This application is the U.S. national phase of International Application No. PCT/FI2023/050042 filed Jan. 19, 2023 which designated the U.S. and claims priority to FI patent application No. 20225064 filed Jan. 26, 2022, the entire contents of each of which are hereby incorporated by reference.

FIELD

The invention relates to a field of forest machines, especially controlling of a seat of the forest machines.

BACKGROUND

Controlling of a seat is very essential in forest machines from an ergonomics point of view. Especially a movable boom of the forest machine causes many challenges for the seat control and the ergonomics since an operator of the forest machine shall be able to follow and control the boom in every situation. In the known solutions, the seat is configured to follow movements of a tip of the boom having a tool. Still, the known solutions have many drawbacks especially from ergonomics point of view. The drawbacks may relate to a viewing direction of the operator when operating with the boom, for example.

Another aspect which affects the economics is how the movement of the seat is implemented. In other words, it is not enough that the seat follows boom, the movement of the seat shall be implemented such that ergonomics is optimal for the operator. The known solutions have many drawbacks also in this area. The drawback may relate to jerky, fast, large, and unnecessary movements of the seat, for example.

For example, a publication FI110502 discloses a solution in which an operation range of the boom is divided into sectors and the seat is aligned with the sectors such that when the boom moves from a first sector to a second sector, the seat follows this movement. Then a viewing direction of the seat is in the sector in which the boom is. In many situations of the forest machines, this may not be sufficient way from the ergonomics point of view to align the movement of the seat with the movement of the boom. Hence, there is a need for a sophisticated solution for improving the seat control and the ergonomics of the operator in the forest machines.

BRIEF DESCRIPTION

The present invention is defined by the subject matter of the independent claims.

Embodiments are defined in the dependent claims.

The embodiments and features, if any, described in this specification that do not fall under the scope of the independent claim are to be interpreted as examples useful for understanding various embodiments of the invention.

LIST OF DRAWINGS

Example embodiments of the present invention are described below, by way of example only, with reference to the accompanying drawings, in which FIGS. 1, 2, 3A, 3B, 4, 6A, 6B and 10 illustrate a seat control arrangement according to embodiments of the invention; and FIGS. 5, 7, 8 and 9 illustrate flow charts according to embodiments of the invention.

DESCRIPTION OF EMBODIMENTS

The following embodiments are only examples. Although the specification may refer to “an” embodiment in several locations, this does not necessarily mean that each such reference is to the same embodiment(s), or that the feature only applies to a single embodiment. Single features of different embodiments may also be combined to provide other embodiments. Furthermore, words “comprising” and “including” should be understood as not limiting the described embodiments to consist of only those features that have been mentioned and such embodiments may contain also features/structures that have not been specifically mentioned. All combinations of the embodiments are considered possible if their combination does not lead to structural or logical contradiction.

The invention may be applied in forest machines wherein a boom is controlled by a tip control, for example. Data relating to the tip control may be used in the invention. In the tip control, an operator gives a command to a tip of a boom assembly with a control device, in other words, a request to move to a particular direction at a particular speed. A required speed of movement is calculated for each actuator of the boom assembly so that by the joint effect of the different actuators of the boom assembly, the desired movement of the tip of the boom assembly is achieved. Still, it is important to realize that the invention may also be applied in the forest machines without the tip control, or in which the tip control is switched off. So the tip control may not be mandatory in the forest machine in which the invention is applied.

The forest machine, referred in this application, may comprise a frame steering. The forest machine having the frame steering usually comprises a front and a back frame coupled together by a hinge allowing movements between the frames and steering of the forest machine. In some cases, the forest machine may comprise three or more frame parts coupled together by the hinges. The forest machine having the front and the back frame is used as an example in this application, but the invention may still be applied in the forest machines having three or more frame parts. The boom and a cabin may be adapted on at least one of the frame parts. The front frame may comprise a cabin and the back frame may comprise the boom, for example in the forest machines having the front and back frame. The forest machine may also comprise a tool adapted to the boom, for example. The operator of the forest machine shall be able to follow the use of the tool. Therefore, the term ‘tip of the boom’ may also refer the tool which is coupled with the tip of the boom. The tool may comprise, for example, a hoisting member, such as a load bucket and/or a wood handling tool, such as a harvester head. The forest machine may be a forwarder or a harvester or a combination of them. Nevertheless, the examples and Figures in this application may refer only to the frame steered machine, the invention may also be applied in the forest machine in which the frame steering is not used.

According to an aspect, there is provided a seat control arrangement of a forest machine comprising a rotating seat having a seat actuator configured to rotate the seat, means for determining at least a position of the seat and a position of a tip of a boom of the forest machine and a processing circuitry configured to provide, based on the determination of the means, a control signal to the seat actuator to rotate the seat such that the position of the seat follows the position of the tip of the boom with a predetermined deviation when the position of the tip of the boom deviates from a base centre line of the forest machine, and wherein the predetermined deviation is towards the base centre line of the forest machine from the position of the tip of the boom.

Because of the clarity, following essential terms used in this application are explained shortly:

- CL1: a centre line of the seat (viewing direction from a middle of the seat)
- CL2: a centre line of the front frame (goes through the middle point of the seat)
- CL3: a line between the tip of the boom and the middle point of the seat.
- CL4: a centre line of the back frame (does not necessarily go thought the middle point of the seat).
- CL5: a line from the middle of the back frame to middle point of the seat.
- RL: a reference line which is a target line for the centre line of the seat
- A1: an angle between CL1 and a base centre line
- A2: an angle between CL1 and CL3
- A3: an angle between CL3 and a base centre line (A1+A2)
- RA: a reference angle between RL and CL3

The term "base centre line" in this application may refer to the centre line of the front frame CL2, the centre line of the back frame CL4, or it may be a centre line of a frame part in which the cabin is (if not in the front frame). It may further refer to a line which goes through a middle point of the back frame and the middle point of the seat (forwarders having a load compartment), or it may refer to a line which goes through a rotation axis of the boom and the middle point of the seat (harvesters). In some case the base centre line may be some other line than presented above. The base centre line may be determined and changed by the operator of the forest machine. The base centre line may also be automatically determined based on a position of the forest machine and/or an operation the forest machine is performing.

This application describes that the direction of the seat is aligned with the tip of the boom with the predetermined deviation. In other words, the seat follows the movement of the tip of the boom such that it is aligned slightly away from the tip. Still, it is important to realize that any other point of the boom may also be used as a reference point instead or in addition to the tip of the boom. The principles of the invention are still valid.

All Figures illustrating the forest machine are from a top view. Hence, most of the directions, lines and angles between the lines in this application may be determined from the top view of the forest machine In an embodiment, illustrated in FIG. 1, the seat control arrangement 100 of the forest machine 102 comprising the seat 104 in the cabin 106. The seat is rotatable around its vertical axis. The seat may rotate 360 degrees around its vertical axis, or the rotation of the seat may be limited such that it is just a part of the 360 degrees. The vertical axis of the seat may be the same as a vertical axis of the forest machine and/or the vertical axis of a body of an operator who is sitting in the seat. Hence, when the seat is rotated around its vertical axis, a viewing direction of the operator can be changed. This enables turning of the seat to a working direction of the forest machine. When the operator drives the forest machine forward, the seat may be directed forward. Respectively, when the operator uses the boom, the seat may be directed backward or towards the boom, for example. It is also possible that the seat follows the movement of the boom when the boom is in use. In other words, the seat is rotated according to the movement of the boom such that the seat is towards the boom.

Figure 2:
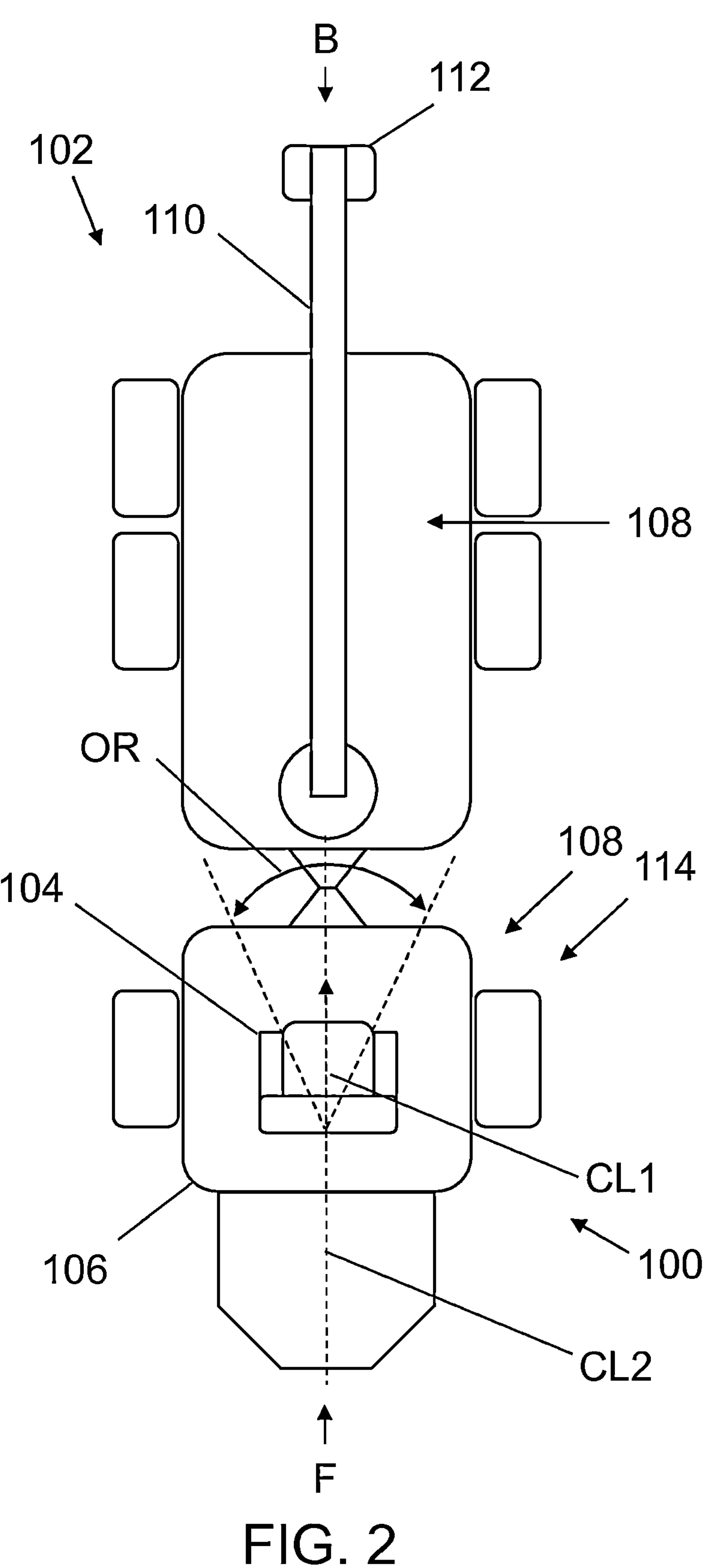
Figure 3A:
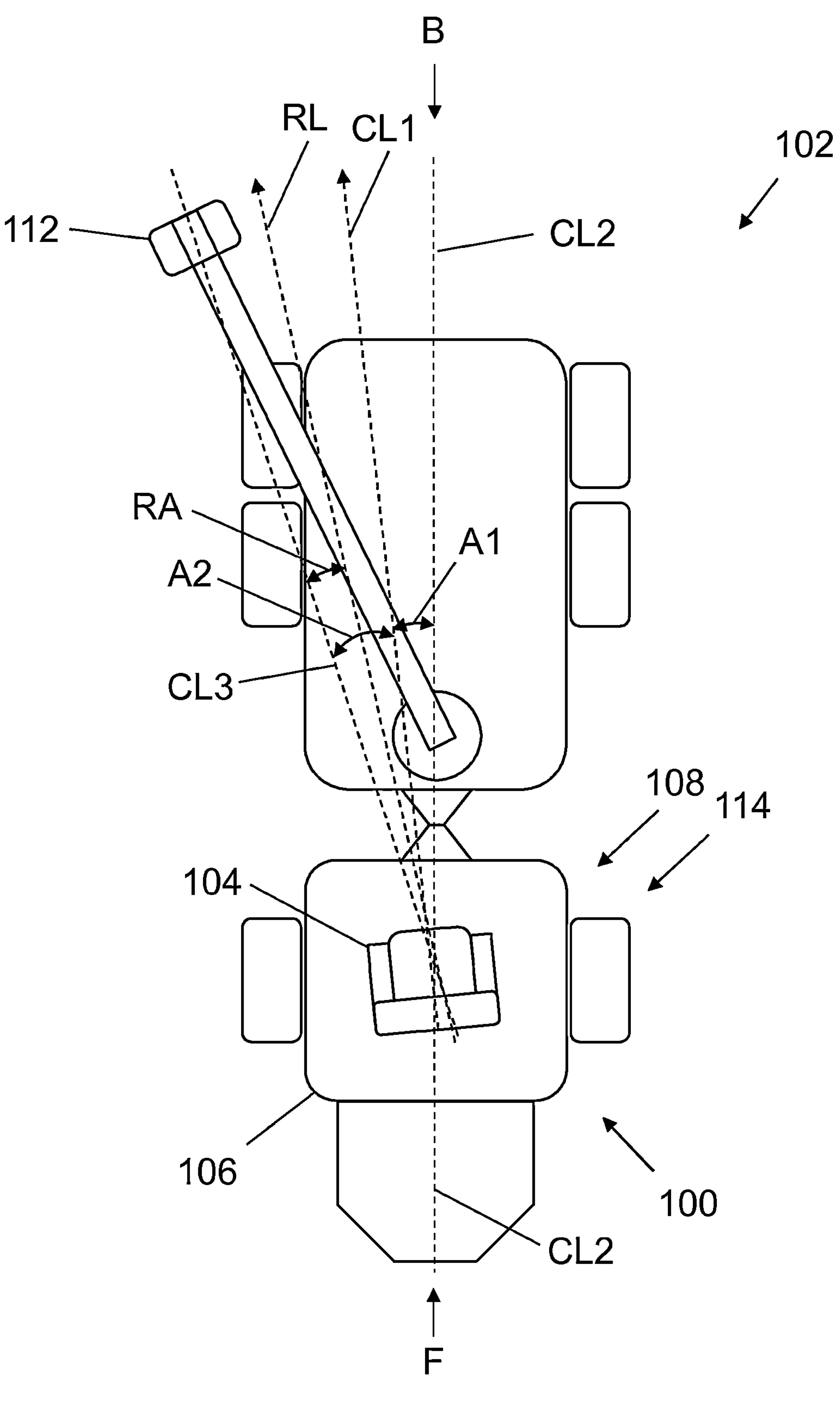

FIG. 1 further illustrates the centre line of the seat CL1. An arrow in the centre line CL1 refers to the viewing and sitting direction of the operator who is sitting on the seat. The term 'position of the seat' refers to the direction in which the viewing and sitting direction (CL1) of the rotating seat is directed. The position of the seat may be changed by rotating the seat. For example, the centre line of the seat CL1 is directed towards a front F of the forest machine 102 in FIG. 1. In other words, the position of the seat 104 is towards the front of the forest machine such that operator's sitting and viewing direction is forward. This is typical direction of the seat when the operator is driving the forest machine forward, for example. FIG. 2 illustrates a situation in which the centre line of the seat CL1 is directed towards a back B of the forest machine 102. Then the position of the seat 104 is backwards such that the operator's sitting and viewing direction is backwards. This is typical direction of the seat when the operator is using or starting to use the boom, for example. In both of the above mentioned positions, the centre line of the seat CL1 may be parallel with a centre line of a front frame of the forest machine CL2. The centre line of the front frame CL2 is illustrated in FIG. 3A, for example. Referring now to FIG. 3A, as described above, the forest machine 102 may have the frame steering having the front frame FF and the back frame BF. The cabin 106 having the seat 104 may be in the front frame. The centre line of the front frame CL2 refers to a longitudinal axis of the front frame, in other words, from a front of the front frame towards a back of the front frame. In FIG. 3A the centre line of the front frame is also the centre line of the back frame since the front and the back frames are aligned.

The position of the seat may also be between the positions in which the viewing direction is forward or backward as illustrated in FIGS. 1 and 2. Still referring to FIG. 3A, as can be seen, the centreline of the seat CL1 deviates from the centre line of the front frame CL2 and hence the viewing direction is not directly forward or backward.

In an embodiment, the seat is coupled with the seat actuator for providing the rotational movement for the seat. In other words, the actuator is configured to provide force to rotate the seat around its vertical axis and hence, the seat actuator is used for changing the position of the seat. The seat actuator may be coupled with a control interface, like buttons, allowing the operator automatically to turn the seat to the right direction. Hence, the seat actuator enables an automatic seat rotation instead or addition to a manual rotation.

In an embodiment, the seat control arrangement further comprises the means for determining at least the position of the seat and the position of the tip of the boom. Referring to FIG. 3A, wherein the base centre line is the centre line of the front frame CL2. The front and back frames are aligned in FIG. 3A which means that their longitudinal centre lines are parallel, and hence the centre line of the front frame CL2 is the same as the centre line of the back frame. In other words, the centre line of the front frame is actually the centre line of the whole forest machine. The seat control arrangement comprises the means 108 for determining the position of the seat that may be configured to detect and/or determine an angle A1 between the centreline of the seat CL1 and the centre line of the front frame CL2 which in this case is the base centre line. Based on the angle A1, the position of the seat (viewing direction) is known. The means (108) are further configured to determine the position of the tip of the boom 112. The determination of the position of the tip of the boom may be performed based on a plurality of information received from the forest machine and/or the boom assembly. The determination may be based on, at least partly, the same parameters and/or data as used in the tip control of the boom, for example. When the position of the tip of the boom is known, a centre line CL3 from the tip 112 to the seat 104 may be determined. Still referring to FIG. 3A in which the centre line CL3 from the tip 112 to the seat 104 is determined. The centre line of the tip CL3 may be aligned substantially with a middle point of the seat 104 such that it intersects the centre line of the seat CL1 in the middle point. The middle point may refer to the point of the seat, which is substantially in the middle of the seat, it may also be same as the vertical axis of the seat which around the seat is rotated as described above. Hence, the centre line of the tip of the boom CL3 and the centre line of the set CL1 may intersect the centre line of the front frame CL2 in the same position (in the middle of the seat). When the centre line of the tip CL3 and the centre line of the seat CL1 are known, the angle A2 between them may be determined. The angle A2 tells the actual deviation between the viewing direction of the seat and the tip of the boom. In other words, the deviation between the position of the tip of the boom and the position of the seat.

In an embodiment, the seat control arrangement 100 further comprises the processing circuitry 114. The processing circuitry may be part of the control equipment of the forest machine and/or the seat control arrangement may comprise an own processing circuitry. Hence, the processing circuitry may be a part of the seat control arrangement or the arrangement may be coupled with the (external) processing circuitry. The processing circuitry may be coupled with the means for determining at least the position of the seat and the position of the tip of the boom of the forest machine.

In an embodiment, the processing circuitry is configured to provide the control signal, based on the determination of the means, to the seat actuator to rotate the seat such that the position of the seat follows the position of the tip of the boom with the predetermined deviation when the position of the tip of the boom deviates from the base centre line of the forest machine. As described above, the position of the tip of the boom and seat as well as deviation between them may be determined based on the centre lines CL1, CL2, CL3, angles A1, A2 and the base centre line that may vary.

In an embodiment, illustrated in FIG. 3A, the processing circuitry is configured to determine a reference angle RA. The reference angle RA may be determined from the centre line of the tip of the boom CL3. The reference angle RA tells the direction in which the seat shall be directed such that the desired predetermined deviation is achieved. In other words, the control signal, provided by the processing circuitry, is configured to align the angle A2 (between the centre line of tip of the boom CL3 and the centre line of the seat CL1) with the reference angle RA. Then the position of the seat follows the position of the tip of the boom with the predetermined deviation which is the reference angle. In other words, the viewing direction of the seat deviates from the tip of the boom by the reference angle and hence, is not directed directly to the tip. By changing the reference angle, the predetermined deviation between the position of the tip and seat may be adjusted. A reference line RL in FIG. 3A shows the viewing direction of the seat when the angle A2 is aligned with the reference angle RA. In other words, the centre line of the seat CL1 is then parallel with the reference line RL. The reference line RL may be determined by the reference angle RA.

In an embodiment, the position of the seat follows the position of the tip of the boom with the predetermined deviation when the position of the tip of the boom deviates from the base centre line of the forest machine. In an embodiment, illustrated for example in FIG. 3A, the base centre line is the centre line of the front frame CL2, but as described above, it may also be some other line in the forest machine.

In an embodiment, the base centre line is determined based on a position of the forest machine. The positions of the frame parts of the forest machine in relation to each other may affect the base centre line, for example.

In another embodiment, the base centre line is determined based on the operation of the forest machine. The base centre line may be determined based on the operation what the operator is going to perform by the forest machine.

Still in another embodiment, the base centre line is determined based on a structure of the forest machine. In other words, the base centre line may vary according to a type of the forest machine. The location of the boom of the forest machine may affect the base centre line. The location of the boom may be in the back frame, in the front frame or between them, for example.

Still referring to FIG. 3A which illustrates the forest machine having the boom 110 in the back frame BF. The type of the forest machine illustrated in FIG. 3A may be the forwarder, for example. As described above, the base centre line may be the centre line of the front frame CL2 in the case of FIG. 3A. Hence, the processing circuitry provides the control signal when the location of the tip of the boom deviates from the base centre line of the front frame CL2. If the tip of the boom is on the base centre line CL2, then the centre line of the tip of the boom CL3 is parallel with the base centre line CL2 and the processing circuitry may not provide the control signal to the seat actuator to rotate the seat such that the position of the seat follows the position of the tip of the boom with the predetermined deviation.

Figure 3B:
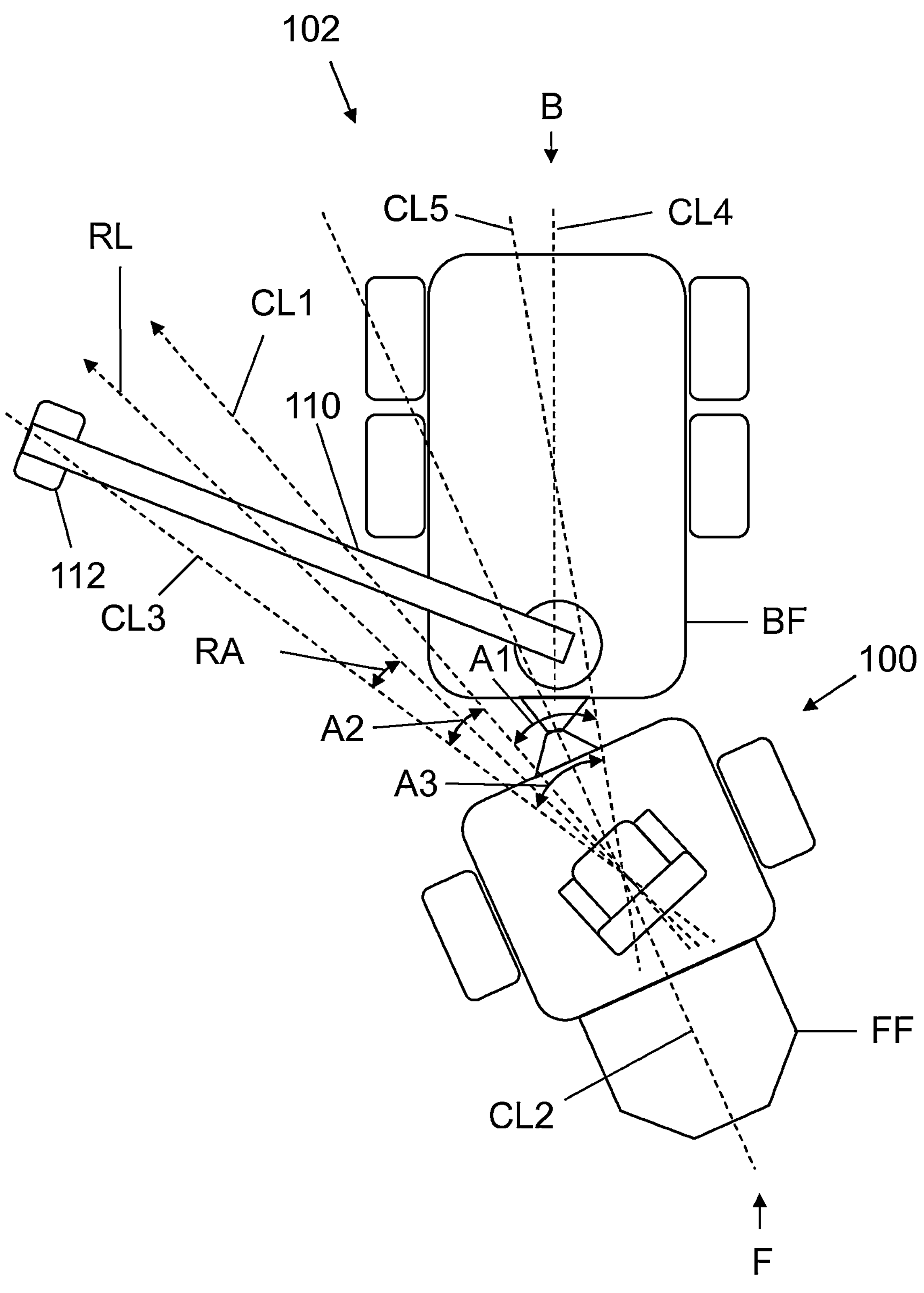

Referring to now FIG. 3B, in which the front frame FF and the back frame BF are not aligned. The base centre line may still be the centre line of the front frame CL2 as described with the FIG. 3A. This may be the case with the harvesters, for example. In another embodiment, the base centre line is a line CL5 from the middle point of the back frame BF to the middle point of the seat 104. This may be the case with the forwarders having a load compartment in the back frame, for example. The same principles are still valid as described above with FIG. 3A, but now the angle A1 is determined between the centre line of the seat CL1 and the base centre line which is the line CL5 from the middle of the back frame to the middle of the seat.

Figure 4:
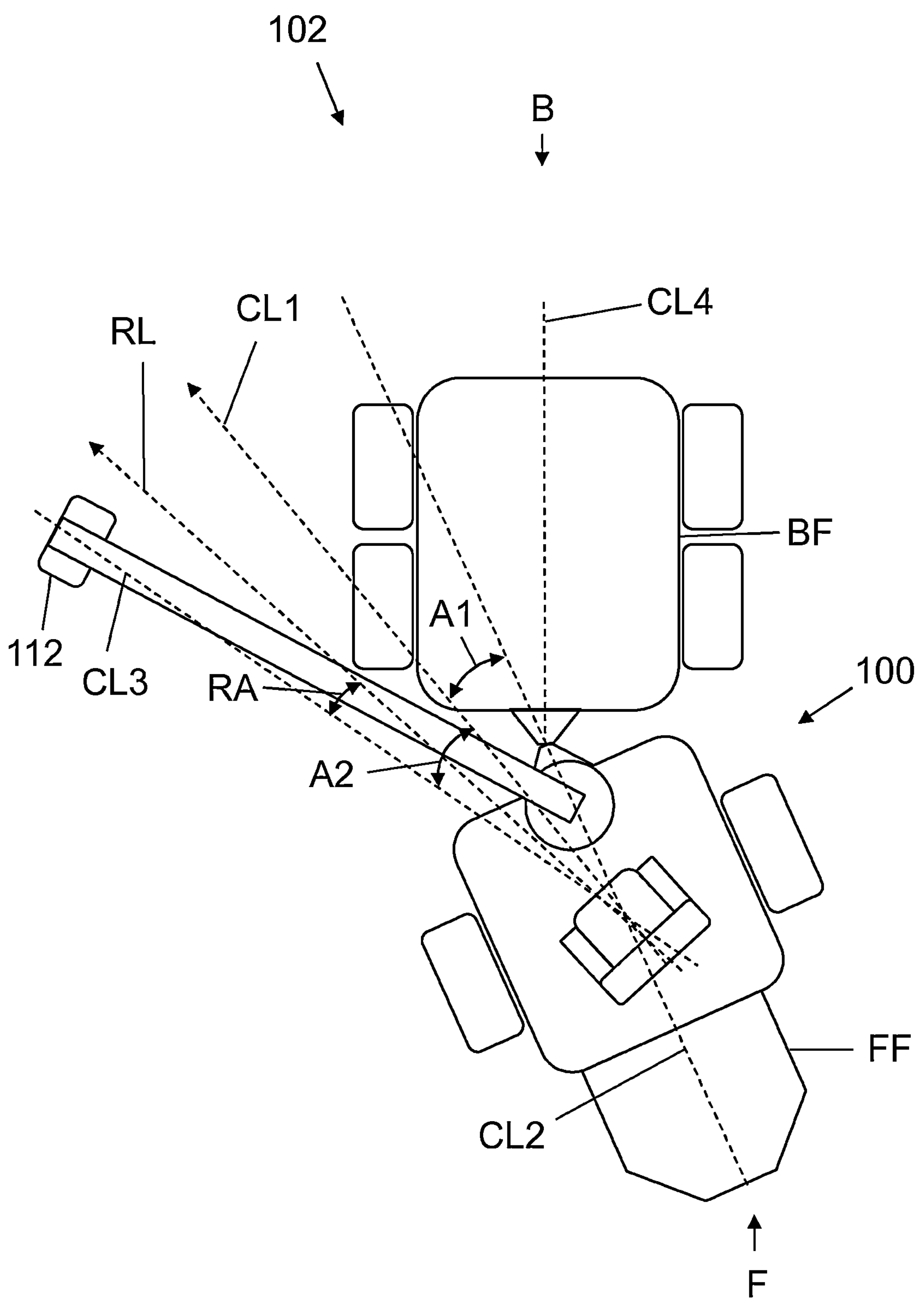

In some cases, the forest machine may comprise more/less than two frame parts, and/or the boom may be adapted on other part than the back frame, and/or the cabin may be adapted other part than the front frame. As an example of said alternative configurations the FIG. 4 illustrates a forest machine with two frames where both the boom and the cabin are adapted to the front frame. Referring now to FIG. 4 in which the front frame FF and the back frame BF are not aligned, and the boom is in the front frame FF. The base centre line may still be the centre line of the front frame CL2, and the same principles may be valid as described with FIG. 3A as the base centre line is the same.

In an embodiment, the base centre line is determined manually. The base centre line may be determined by the operator of the forest machine, for example. Then the operator may determine the base centre line based on the own needs (likings), and/or the operation(s) he/she is going to perform by the forest machine, for example.

In another embodiment, the base centre line is determined automatically by the processing circuitry. The processing circuitry may be configured to determine, based on the data received from the sensors and/or control system of the forest machine, the base centre line for the forest machine which is the most optimal for the position of the forest machine and/or operation that is going to be performed with the forest machine.

For example, the operator may define, via control interface of the forest machine, is the base centre line determined manually or automatically.

In an embodiment, the predetermined deviation is towards the base centre line of the forest machine from the position of the tip of the boom. Still referring to FIG. 3A, as described above, the angle A2 tells the actual deviation between the tip of the boom 112 and the centreline of the seat CL1, and the reference angle RA tells what the deviation should be that the predetermined deviation is achieved. The reference angle RA may be configured to deviate the reference line RL from the centre line of the tip of the boom (CL3) such that the deviation is towards the base centre line of the forest machine. For example, in FIG. 3A the base centre line is the centre line of the front frame CL2, and the predetermined deviation (RA, RL) is towards the base centre line CL2 from the centre line CL3 of the boom tip 112. Hence, the centre line of the seat CL1 (position of the seat) moves behind the tip of the boom (position of the tip of the boom) when the tip is moved away from the forest machine (base centre line), and respectively when the tip of the boom moves towards the forest machine (base centre line), the centre line of the seat CL1 moves ahead the tip of the boom 112.

Figure 10:
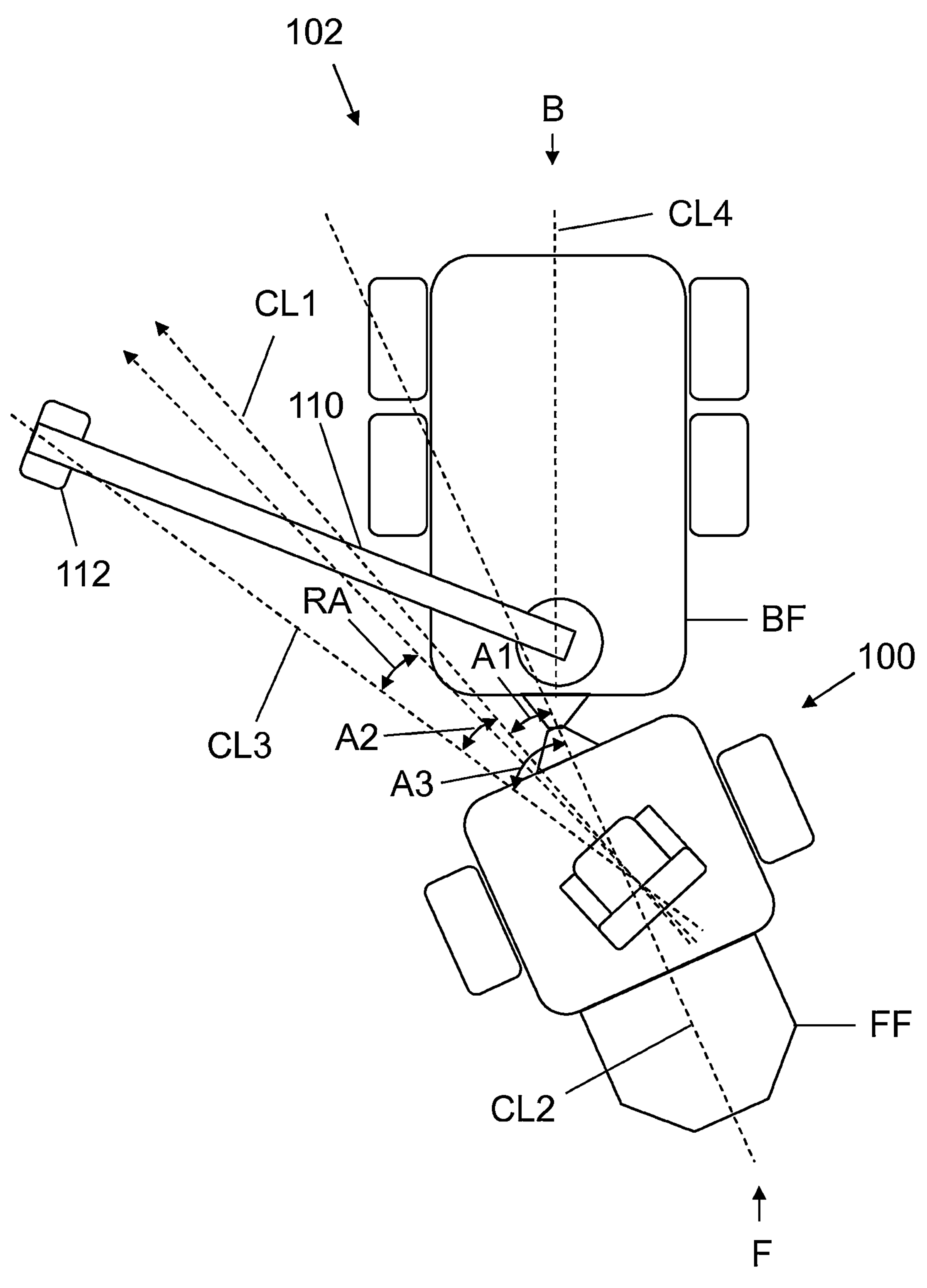

In an embodiment, the predetermined deviation is a part of an actual deviation between the tip of the boom and the base centre line of the forest machine. Referring to FIG. 10, wherein the base centre line may be the centre line of the front frame CL2. The actual deviation between the tip of the boom and the base centre line CL2 may be an angle A3, which may also be a combination of the angle A1 and A2. The predetermined deviation may be determined to be the reference angle RA, and then the reference angle RA is a part of the angle A3. The reference angle RA (predetermined deviation) may be 30% of the angle A3, for example. In this example, the base centre line is the centre line of front frame CL2, but as described above, the base centre line may be determined a plurality of the ways which may affect the determination of the reference angle. For example, in FIG. 3B the base centre line may be the line from the middle of the back frame to the middle of the seat CL5, and then the angle between the lines CL3 and CL5 is the angle A3 (A1+A2) from which the reference angle RA is determined.

In an embodiment, the reference angle varies such that on an edge of the operation range of the seat the reference angle RA may be 30 degrees, and when position of the tip of the boom is approaching the base centre line, it is getting smaller such that when the tip of the boom is on the centre base line, the reference angle is 0 degrees.

In an embodiment, the processing circuitry is configured to provide the control signal when the reference angle RA between the position of the tip of the boom and the centre line of the seat is changed more than a predetermined value. The predetermined value may refer to a tolerance. For example, a minor movement of the tip of the boom may affect the reference angle RA, and this may cause a minor deviation between the position of the tip of the boom and centre line of the seat. But if the minor movement of the tip of the boom does change the angle RA enough (the tolerance not exceeded), the control signal is not provided. Then the unnecessary movement of the seat, which does not actually affect the ergonomics of the operator, may be avoided nevertheless the tip of the boom may slightly move.

In an embodiment, the tolerance comprises an angle. The tolerance may be 0.1-5 degrees, for example. Hence, if the change of the reference angle RA between the tip of the boom and the centre line of the seat is less than the tolerance, in other words the tolerance is not exceeded, the processing circuitry does not provide the control signal.

In another embodiment, the tolerance comprises time. The time tolerance may be 0.1-10 seconds, for example, typically 1-3 seconds. Hence, if the duration of the deviation (change in the reference angle RA) is less than the time tolerance, in other words the time tolerance is not exceeded, the processing circuitry does not provide the control signal. Filtering of the signal(s) in the seat control arrangement may also cause a time delay, which may also be used to remove sudden changes in the position of the seat.

In a further embodiment, the tolerance comprises the angle and time. Then both tolerances must be exceeded before the processing circuitry provides the control signal.

Figure 5:
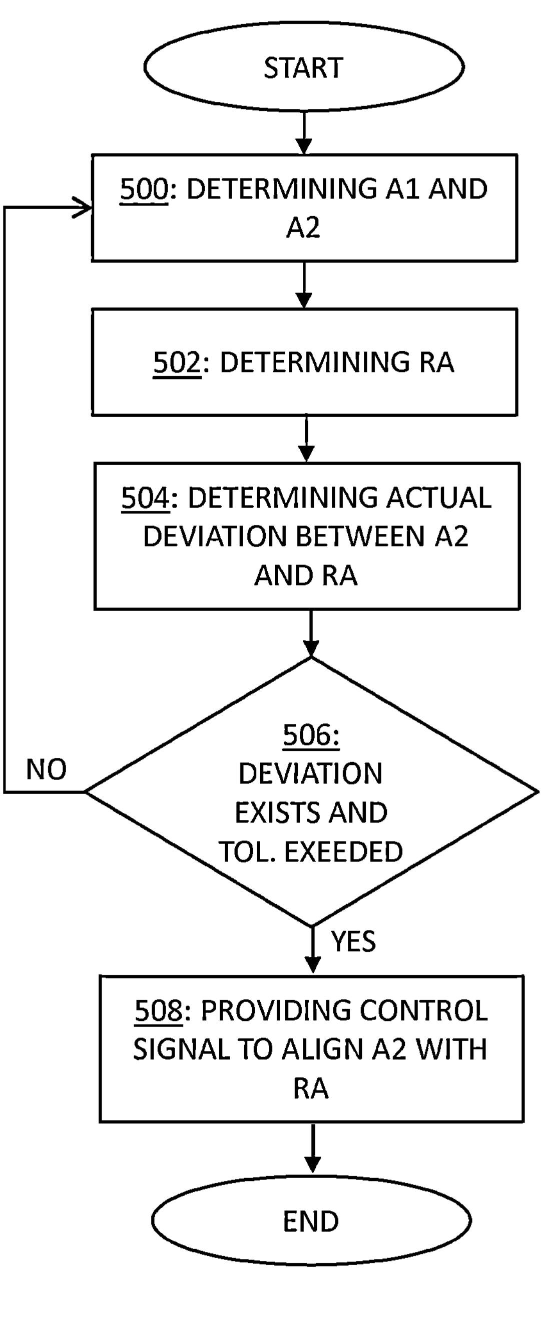

In addition to the above mentioned tolerance(s) for the seat control arrangement, the forest machine may comprise a tolerance for controlling a hysteresis of the boom. The hysteresis tolerance may comprise an angle and/or time. If the given tolerance is not exceeded, the control unit (the processing circuitry) of the forest machine is configured to determine that the boom is stationary. Hence, the minor movement of the boom may not trigger any movement based changes in the operations of the forest machine. The hysteresis may be controlled such that the mentioned reference angle RA is changed and updated when the change in the angle A2 between the tip of the boom and the base centreline is greater than 4 degrees, and stopped when it is less than 1 degree, for example. Controlling of the hysteresis is well known and obvious to the skilled person, and therefore it is not described with greater details in this application. Referring now to FIG. 5 which illustrates a function of the invention in a flow chart according to an embodiment. In this example, the base centre line is the centre line of the front frame CL2. In a first step [block 500], the angle A1 between the centre line of the seat CL1 and the centre line of the front frame CL2 (base centre line), and the angle A2 between the centre line of the seat CL1 the centre line of the tip CL3 are determined. In a second step [block 502] the reference angle RA is determined. In a third step [block 504] the angle A2 between the centre line of the seat CL1 the centre line of the tip CL3 is compared to the reference angle RA, and the deviation between them is determined. If the deviation exists and tolerance is exceeded, then in a fifth step [block 506] the processing circuitry provides the control signal to the seat actuator to align the angle A2 with the reference angle RA. If the deviation does not exist and/or the tolerance is not exceeded, the angle A1 and A2 are determined again.

Figure 6A:
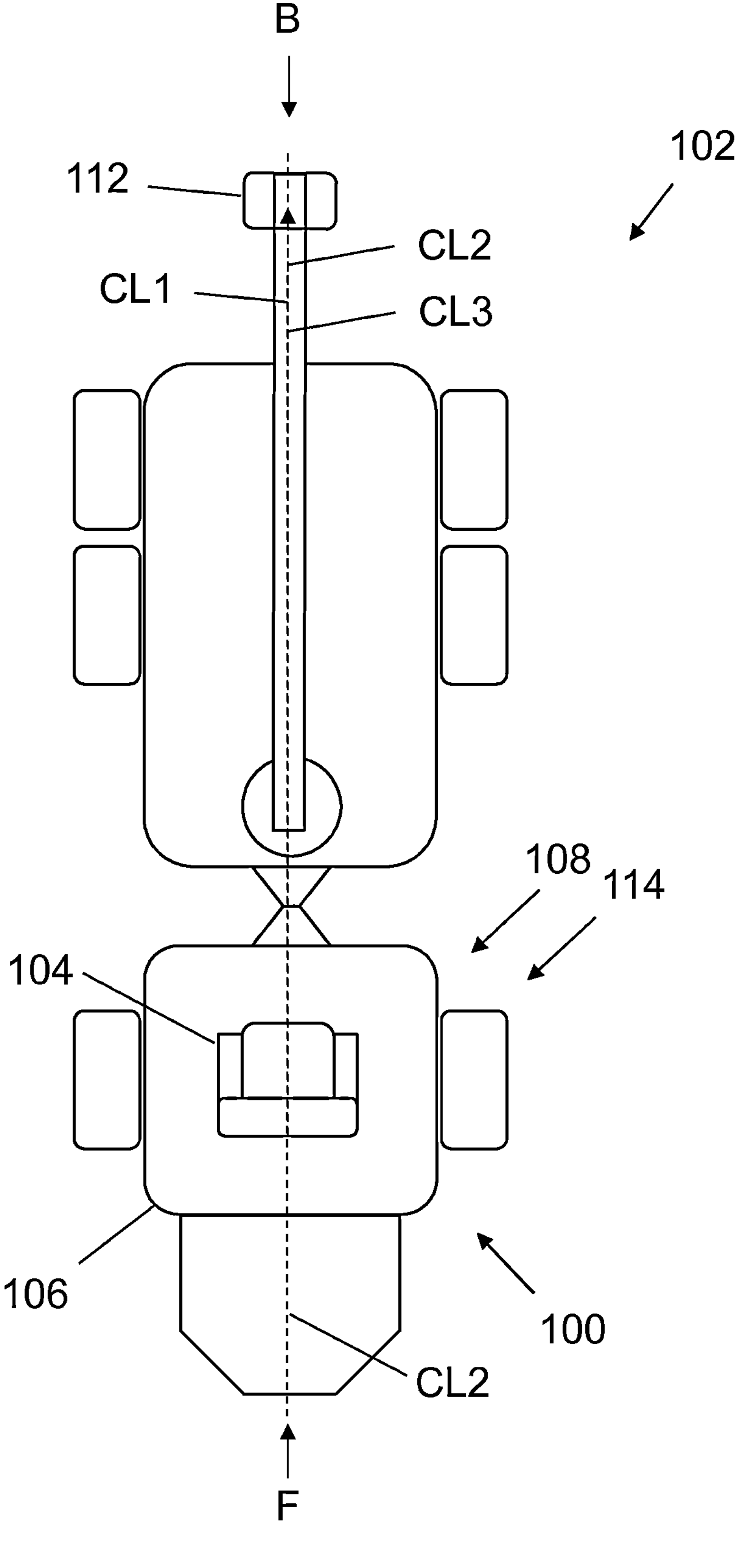

In an embodiment, the processing circuitry is configured to provide the control signal to align the position of the seat with the position of the tip of the boom when the position of the tip of the boom is on the base centre line of the forest machine. Referring to FIG. 6A, in which the base centre line may be the line CL2. When the position of the tip 112 is on the base centre line CL2, the processing circuitry 114 is configured to provide the control signal to the seat actuator to rotate the seat 104 such that the position of the seat 104 is in line with the position of the tip of the boom 112. In other words, when the tip of the boom 112 is on the base line of the forest machine CL2, the centre line of the seat CL1 is aligned with the centre line of the tip of the boom CL3 as illustrated in FIG. 6A. This means that the reference angle RA is set to zero. Then there may not be the remarkably deviation between the position of the tip and the position of the seat.

Figure 6B:
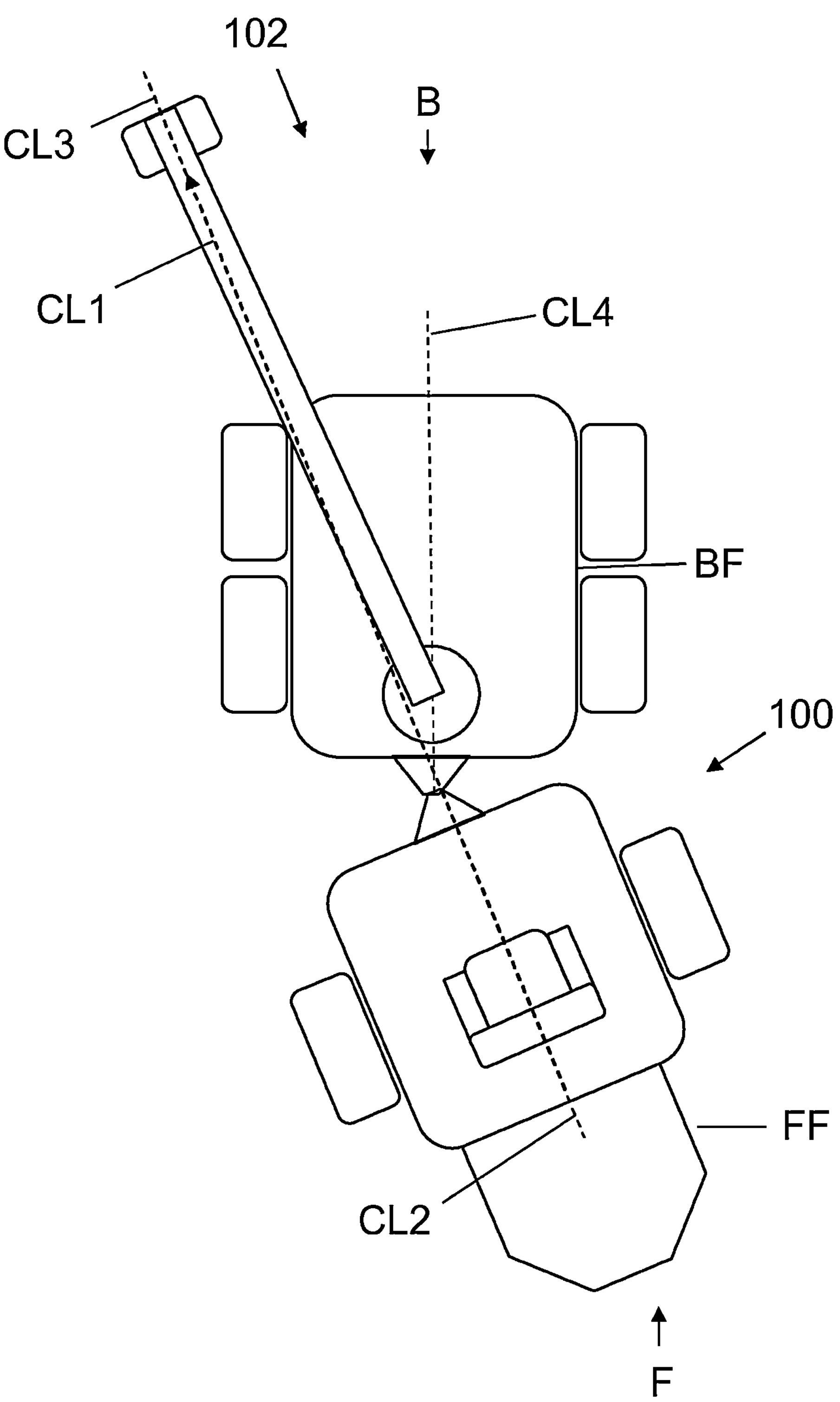

Referring now to FIG. 6B, wherein the front and the back frames FF, BF are not aligned, and the base centre line is the centre line of the front frame CL2, and the position of the tip 112 is on the base centre line. Also, in this situation, the angle A1 between the centre line of the seat CL1 and the centre line of the front frame CL2 (base centre line) may be determined and then the position of the seat is known. The angle A2 between the centre line of the tip of the boom CL3 and the centre line of the seat CL1 is determined as well, and then the actual deviation between the position of the tip and the seat is known. If the deviation exists and possible tolerance exceeded, the processing circuitry provides the control signal to the seat actuator to rotate the seat such that the centre line of the seat CL1 is aligned with the centre line of the tip of the boom CL3 (CL1 is parallel with CL3) as illustrated in FIG. 6B. In other words, the seat is rotated such that the angle A2 is substantially zero. Then the seat is directed substantially towards the tip of the boom without the deviation since the tip of the boom is on the base centre line.

Figure 7:
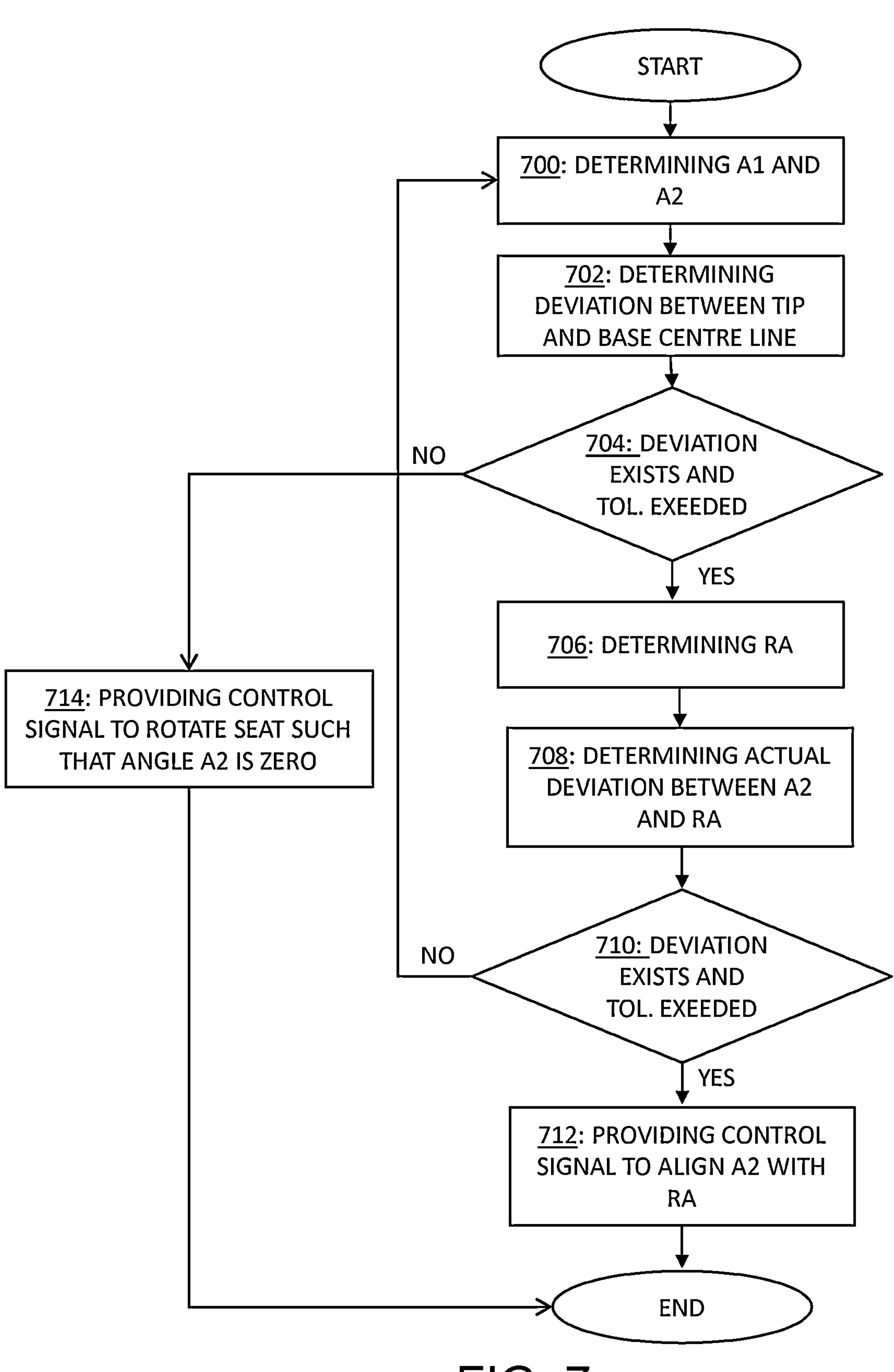

Referring now to FIG. 7, which is a flow chart according to an embodiment of the invention. In this example the base centre line is the centre line of the front frame CL2. In a first step [block 700], the angle A1 between the centre line of the seat CL1 and the centre line of the front frame CL2 (base centre line), and the angle A2 between the centre line of the seat CL1 the centre line of the tip CL3 are determined. In a second step [block 702], the deviation between the tip of the boom and the base centre line is determined, in other words, is the tip of the boom substantially on the base centre line or not. In a third step [block 704], it is determined that does the deviation between the tip of the boom and the base centre line exist or not. If the deviation exists and the tolerance is exceeded, then in a fourth step [block 706] the reference angle RA is determined. In a fifth step [block 708], the angle A2 between the centre line of the seat CL1 and the centre line of the tip CL3 is compared to the reference angle RA and the deviation between them is determined. In a sixth step [block 710], it is determined that does the deviation between the angles A2 and RA exist or not. If the deviation exists and tolerance is exceeded, then in a seventh step [block 712] the processing circuitry provides the control signal to the seat actuator to align the angle A2 with the reference angle RA. If the deviation does not exist and/or the tolerance is not exceeded, the angle A1 and A2 are determined again. Referring now back to the third step [block 704), if the deviation between the tip of the boom and the base centre line does not exist and/or the tolerance is not exceeded, in other words the tip of the boom is on the base centre line, then in a seventh step [block 714] the processing circuitry provides the control signal to the seat actuator to rotate the seat such that the angle A2 is set substantially to zero. Then the centre line of the seat is directed to the tip of the boom and deviation between the tip of the boom and centre line of the seat does not exists.

The technical effect of above mentioned features is that the predetermined deviation between the tip of the boom and viewing direction of the seat improves the ergonomics of the operator compared to the situation in which the seat is directed exactly towards the tip of the boom all the time.

All the example and embodiments may be illustrated in Figures only from one side of the forest machine, but the invention can be applied on both sides of the forest machine. The same principles are still valid.

In an embodiment, the means for determining at least the position of the seat and the position of the tip of the boom of the forest machine comprises one or more sensors. The boom assembly may comprise one or more travel speed sensors, for example. The travel speed sensor may be a position sensor, for example. The travel speed sensor allows, for example, an angle and angular acceleration of the boom to be measured. Further, the travel speed sensor allows, for example, the position of the boom and travel speed of a piston of the actuator cylinder to be measured. The travel speed sensor may comprise an inclinometer and/or gyroscope, for example. Further there may be one or more magnetostrictive linear sensors in connection with the base of the boom as the travel speed sensor, providing information on the turning angle. Likewise, the telescopic extension may have a magnetostrictive linear sensor as the travel speed sensor. One or more rotation angle sensors may be used for providing information on the turning angle of the boom. Furthermore, the boom assembly may have one or more pressure sensors. The pressure sensor may in principle be adapted in any place of a pressure system of the forest machine. Further, the boom assembly may comprise a weighing sensor for measuring a mass of a load at the tip of the boom. The one or more sensors may comprise one or more cameras configured to determine the position of the boom and/or the position of the seat. Alternatively, the position of the seat can be determined using absolute or incremental encoders.

In an embodiment, the means for determining at least the position of the seat and the position of a tip of a boom of the forest machine comprises the control data of the forest machine. The control data may comprise any kind of control data received from the operation of the forest machine. The control data may be received from the control system of the forest machine. The control data in this case may refer to the data that is not sensor based data, it is received from the control system of the forest machine instead. The control data may comprise a control data of the boom assembly and/or the seat. The seat actuator maybe an electric motor like a DC servo or a step motor, for example. The control data of the electric motor may be used in the determination of the position of the seat, for example.

In an embodiment, the position of the boom may be determined by a transmitter-receiver.

In an embodiment, the processing circuitry is further configured to activate and/or deactivate the seat control arrangement, wherein the processing circuitry is configured to provide the control signal when the seat control arrangement is active. If the seat control arrangement is deactivated, the processing circuitry may not provide the control signal and the position of the seat is not changed nevertheless the position of the tip of the boom is changed. For example, the processing circuitry may be coupled with an external control interface which is configured to provide an activation and/or deactivation signal for the processing circuitry. The activation signal may trigger the processing circuitry to activate the seat control arrangement.

In an embodiment, the seat control arrangement further comprises a switch configured to provide the activation and/or a deactivation signal to the processing circuitry. The switch may in the cabin of the forest machine. It may be in the control interface of the forest machine, for example. The switch may comprise a button and/or a touch screen, for example. The operator of the forest machine may press the switch which triggers the processing circuitry to activate or deactivate the seat control arrangement.

In an embodiment, the processing circuitry is configured to determine, based on determination of the means, the position of the seat before the activation of the seat control arrangement. The activation of the seat control arrangement may be possible only in the certain positions of the seat. For example, if the operator wants to activate the seat control arrangement, the seat shall be first directed towards the back of the forest machine, and then the activation of the seat control arrangement is possible. This feature prevents an accidental activation of the seat control arrangement that may cause issues in the work.

In an embodiment, the seat further comprises a safety belt, wherein the one or more sensors are further configured to detect a state of the safety belt and the processing circuitry is configured to activate and/or deactivate the seat control arrangement based on the state of the safety belt. For example, the activation of the seat control arrangement may require that the safety belt is on. If the seat control arrangement is activated and the safety belt is turned off, the processing circuitry may deactivate the seat control arrangement. This also improves the work safety.

In an embodiment, the one or more sensors are further configured to detect a state of a door of the forest machine and the processing circuitry is configured to activate and/or deactivate the seat control arrangement based on the state of the door. For example, the activation of the seat control arrangement may require that the doors are in a closed state. If the seat control arrangement is activated and the door is opened, the processing circuitry may deactivate the seat control arrangement. This also improves the work safety.

In an embodiment, a speed of the rotation, provided by the seat actuator, is slower at the end of the rotational movement of the seat.

In an embodiment, the speed of the rotation, provided by the seat actuator, is slower at the beginning of the rotational movement of the seat. The slower speed at the beginning and/or at the end of the rotational movement makes the automated rotation of the seat more comfortable for the operator.

Figure 8:
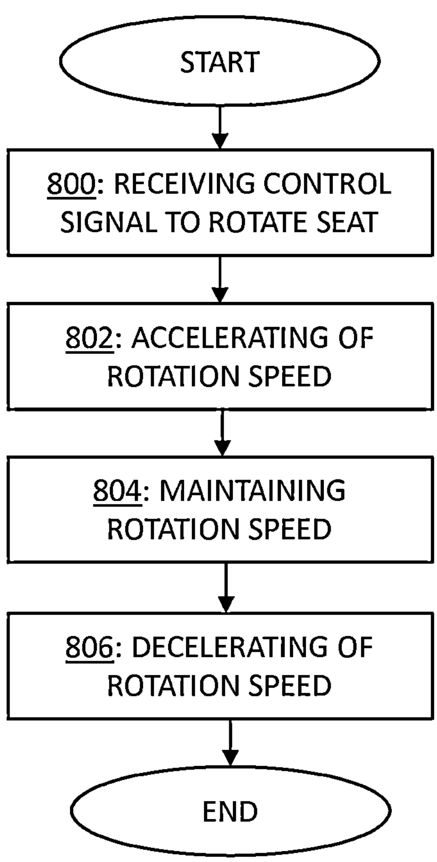

FIG. 8 illustrates a flow chart of the rotational movement of the seat. In a first step [800] the control signal is received by the seat actuator to rotate the seat. In a second step [block 802] the seat actuator accelerates the rotation speed. In a third step [804] the seat actuator maintains the rotation speed. In a fourth step [block 806] the seat actuator decelerates the rotation speed.

Still referring to FIG. 8 the rotational movement of the seat may be performed in three phases. At first, the seat actuator starts to accelerate the rotation speed. When the maximum rotation speed of the seat is achieved, the seat actuator maintains the maximum speed. At the end of the rotational movement, the seat actuator starts to decelerate the rotation speed until the seat stops, in other words, the rotational movement is done. It may also be possible that the rotation speed is decelerated directly from the acceleration or vice versa. If the boom stops and/or the moving direction of the boom is changed during the rotation of the seat, the rotation speed of the seat may be decelerated, and the rotation direction may be changed according to the movements of the tip of the boom. And at the beginning of the rotational movement to the new direction, the speed is accelerated gradually, in other words, the rotational speed is slower at the beginning of the movement.

In an embodiment, the rotation speed of the seat is adjustable. The adjustment of the rotation speed may be performed by the operator of the forest machine and/or it may be performed automatically by the processing circuitry.

Referring to FIG. 2, in an embodiment, the seat control arrangement 100 comprises the operating range OR for the rotation of the seat 104. The operation range refers to a turning range of the seat. The operating range may be +/−180 degrees, or it may be limited. If the operating range is 180 degrees, then the seat can be rotated 360 degrees. In a first embodiment, the operation may be limited such that it is +/−110 degrees. In a second embodiment, the operation range may be +/−45 degrees. In a third embodiment, the operation range may be +/−30 degrees.

In an embodiment, the operation range of the seat may be adjustable. The operation range may be determined by the operator of the forest machine. The operation range may also be adjusted automatically on basis of the information about machine and operation to be performed.

In an embodiment, the operation range is asymmetrical, in other words is not symmetrical. Then the range may be +70/−30 degrees, for example. Also in this embodiment, the operation range of the seat may by be determined by the operator of the forest machine or adjusted automatically.

In an embodiment, a zero point of the operating range OR is adjustable. The zero point may refer to a zero angle of the seat in which the angle of the position of the seat is zero. For example, FIG. 2 illustrates symmetrical operation range in which the zero point may be centreline of the front frame CL2. The operation range in FIG. 2 may be +/−30 degrees, for example. Then the position of the seat is in the zero point when the seat (CL1) is aligned with the centre line of the front frame CL2. Instead of the front frame, the zero point may also be the base centre line of the forest machine if it is different than the centre line of the front frame, or any other direction. Normally it may be the centre line of the frame in which the cabin and the seat are. In an embodiment, the zero point (zero angle) of the operation range may be determined by the operator of the forest machine. In another embodiment the zero point (zero angle) is automatically aligned with the centre base line.

If the tip of the boom moves such that the centre line of the seat CL1 (viewing direction of the seat) is out of the operating range, the seat is stopped when a limit of the operating range is achieved. When the boom moves such that the centre line of the seat CL1 comes inside the range again, the seat start to follow (with the deviation) the movement of the tip.

Figure 9:
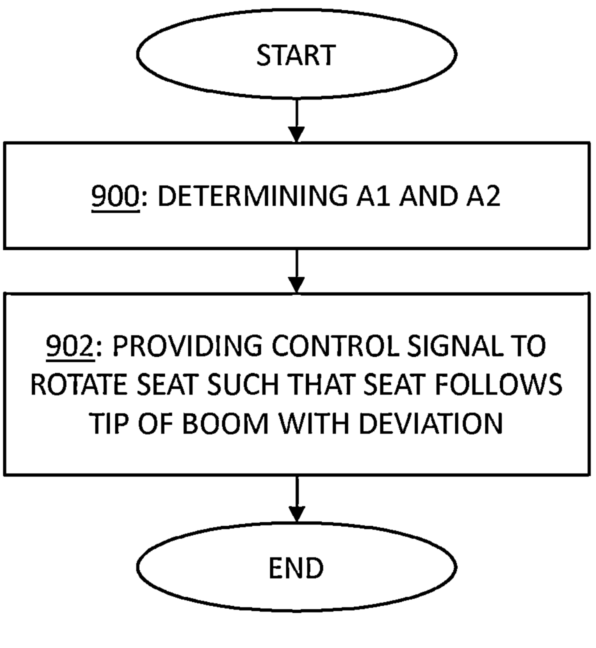

According to another aspect, there is provide a method for controlling the seat of the forest machine as illustrated in FIG. 9. The method comprises following steps: [block 900] detecting, by the means for determining at least the position of the seat and the position of the tip of the boom of the forest machine, at least the position of the seat and the position of the tip of the boom of the forest machine, and [block 902] providing, by the processing circuitry, based on the determination of the means, a control signal to the seat actuator to rotate the seat such that the position of the seat follows the position of the tip of the boom with a predetermined deviation when the position of the tip of the boom deviates from the base centre line of the back frame of the forest machine, and wherein the predetermined deviation is towards the base centre line of the forest machine from the position of the tip of the boom According to still another aspect, there is provided a computer program product comprising instructions to cause the seat control arrangement to execute any steps of the invention described in this application. The computer program may execute at least following steps: determining, by means, at least a position of the seat and a position of a tip of a boom of the forest machine; and providing, by the processing circuitry, based on the determination of the means, a control signal to the seat actuator to rotate the seat such that the position of the seat follows the position of the tip of the boom with a predetermined deviation when the position of the tip of the boom deviates from a base centre line of the forest machine, and wherein the predetermined deviation is towards the base centre line of the forest machine from the position of the tip of the boom.

The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

It is known from the prior art that the seat may be configured to follow the movement of the boom such that the viewing and sitting direction of the seat is towards the tip of the boom. This is not necessarily the optimal solution from the ergonomics point of view. The invention provides a solution in which the seat is aligned with the tip of the boom with the predetermined deviation such that the viewing direction of the seat (CL1) is slightly towards the base centre line of the forest machine from the tip of the boom. When the tip of the boom is moved away from the forest machine, the viewing direction of the seat (CL1) moves behind the tip of the boom (position of the tip of the boom), and respectively when the tip of the boom moves towards the forest machine, the viewing direction of the seat (CL1) moves ahead the tip of the boom. This deviation enables better ergonomic to the operator of the forest machine.

As used in this application, the term ‘processing circuitry’ may refer to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

It will be obvious to a person skilled in the art that, as technology advances, the inventive concept can be implemented in various ways. The invention and its embodiments are not limited to the example embodiments described above but may vary within the scope of the claims.

The invention claimed is:

1. A seat control arrangement of a forest machine, comprising:

a rotating seat having a seat actuator configured to rotate the seat;

means for determining at least a position of the seat and a position of a tip of a boom of the forest machine; and a processing circuitry configured to provide, based on the determination of the means, a control signal to the seat actuator to rotate the seat such that the position of the seat follows the position of the tip of the boom with a predetermined deviation when the position of the tip of the boom deviates from a base centre line of the forest machine, and wherein the predetermined deviation is towards the base centre line of the forest machine from the position of the tip of the boom.

2. The seat control arrangement of claim 1, wherein the base centre line is determined based on a position and/or an operation of the forest machine.

3. The seat control arrangement of claim 1, wherein the base centre line is determined manually.

4. The seat control arrangement of claim 1, wherein the base centre line is determined automatically by the processing circuitry.

5. The seat control arrangement of claim 1, wherein the means for determining the position of the seat and the position of the tip of the boom of the forest machine comprise at least one or more sensors and/or control data of the forest machine.

6. The seat control arrangement of claim 1, wherein the processing circuitry-is configured to provide the control signal to align the position of the seat with the position of the tip of the boom when the position of the tip of the boom is on the base centre line of the forest machine.

7. The seat control arrangement of claim 1, wherein a speed of the rotation, provided by the seat actuator, is slower at the end of the rotational movement.

8. The seat control arrangement of claim 1, wherein the speed of the rotation, provided by the seat actuator, is slower at the beginning of the rotational movement.

9. The seat control arrangement of claim 1, wherein the rotation speed of the seat is adjustable.

10. The seat control arrangement of claim 1, wherein an operation range of the seat is adjustable.

11. The seat control arrangement of claim 1, wherein the predetermined deviation is a part of an actual deviation between the tip of the boom and the base centre line of the forest machine.

12. The seat control arrangement of claim 11, wherein the predetermined deviation is variable.

13. The seat control arrangement of claim 1, wherein the processing circuitry is configured to provide the control signal when an angle between the position of the tip of the boom and the position of the seat is changed more than a predetermined value.

14. The seat control arrangement of claim 13, wherein the predetermined value comprises an angle and/or time.

15. The seat control arrangement of claim 1, wherein the processing circuitry is further configured to activate and/or deactivate the seat control arrangement, wherein the processing circuitry-is configured to provide the control signal when the seat control arrangement is active.

16. The seat control arrangement of claim 15, wherein the seat control arrangement further comprises a switch, coupled with the processing circuitry, configured to activate and/or deactivate the seat control arrangement.

17. The seat control arrangement of claim 15, wherein the processing circuitry is configured to determine, based on the means, the position of the seat before the activation of the seat control arrangement.

18. The seat control arrangement of claim 15, wherein the seat further comprises a safety belt and one or more sensors are configured to detect a state of the safety belt, and the processing circuitry is configured to activate and/or deactivate the seat control arrangement based on the state of the safety belt.

19. The seat control arrangement of claim 15, wherein the one or more sensors are further configured to detect a state of a door of the forest machine and the processing circuitry is configured to activate and/or deactivate the seat control arrangement based on the state of the door.

20. A method for controlling a seat of a forest machine comprising:

determining, by means for determining at least a position of the seat and a position of a tip of a boom of the forest machine, at least the position of the seat and the position of the tip of the boom of the forest machine; and providing, by a processing circuitry, based on the determination of the means, a control signal to a seat actuator to rotate the seat such that the position of the seat follows the position of the tip of the boom with a predetermined deviation when the position of the tip of the boom deviates from a base centre line of the forest machine, and wherein the predetermined deviation is towards the base centre line of the forest machine from the position of the tip of the boom.

21. A computer program product comprising instructions to cause a seat control arrangement to execute at least the following steps:

determining, by means for determining at least a position of a seat and a position of a tip of a boom of a forest machine, at least the position of the seat and the position of the tip of the boom of the forest machine; and providing, by a processing circuitry, based on the determination of the means, a control signal to a seat actuator to rotate the seat such that the position of the seat follows the position of the tip of the boom with a predetermined deviation when the position of the tip of the boom deviates from a base centre line of the forest machine, and wherein the predetermined deviation is towards the base centre line of the forest machine from the position of the tip of the boom.

* * * * *